US012613200B2

(12) United States Patent
Lee

(10) Patent No.: US 12,613,200 B2
(45) Date of Patent: Apr. 28, 2026

(54) ELECTRODE TAB ALIGNMENT MECHANISM AND X-RAY INSPECTION APPARATUS COMPRISING SAME FOR INSPECTING CYLINDRICAL SECONDARY BATTERY

(71) Applicant: INNOMETRY CO., LTD., Anyang-Si (KR)

(72) Inventor: Keun Sun Lee, Cheonan-Si (KR)

(73) Assignee: INNOMETRY CO., LTD., Anyang-Si (KR)

( * ) Notice: Subject to any disclaimer, the term of this patent is extended or adjusted under 35 U.S.C. 154(b) by 1091 days.

(21) Appl. No.: 17/625,163

(22) PCT Filed: Jul. 9, 2019

(86) PCT No.: PCT/KR2019/008452
§ 371 (c)(1),
(2) Date: Jul. 19, 2022

(87) PCT Pub. No.: WO2021/006381
PCT Pub. Date: Jan. 14, 2021

(65) Prior Publication Data
US 2022/0357287 A1     Nov. 10, 2022

(51) Int. Cl.
*G01N 23/04* (2018.01)
*H01M 10/04* (2006.01)

(52) U.S. Cl.
CPC .......... *G01N 23/04* (2013.01); *H01M 10/045* (2013.01)

(58) Field of Classification Search
CPC ..... H01M 10/04; H01M 10/045; G01N 23/04

USPC .......................................................... 429/94
See application file for complete search history.

(56) References Cited

U.S. PATENT DOCUMENTS 8,499,924 B2     8/2013   Kobayashi

FOREIGN PATENT DOCUMENTS

| KR | 10-1998-0040980 | A | 8/1998 |
| KR | 10-1998-0075096 | A | 11/1998 |
| KR | 10-1678488 | B1 | 11/2016 |
| KR | 10-2017-0016179 | | 2/2017 |

(Continued)

OTHER PUBLICATIONS

Machine translation of WO 2017022890 A1 (Year: 2017).*

(Continued)

*Primary Examiner* — Kevin P Kerns
(74) *Attorney, Agent, or Firm* — Moser Taboada

(57) ABSTRACT

An X-ray inspection apparatus for a cylindrical secondary battery includes an inspection chamber, a transfer unit that moves the battery into the chamber, and an inspection body configured to move while holding the battery. An X-ray source irradiates the battery, and an X-ray detector detects the transmitted X-rays. A discharge unit removes the battery after inspection. The apparatus further includes an alignment mechanism arranged along the moving path of the inspection body to align the cylindrical secondary battery. The alignment mechanism has one or more sensing units that sense a position of a specific portion of the battery; and one or more contact units operable between a standby position in which the contact unit does not contact the battery and a contact position in which the contact unit can contact the battery to align the battery during movement.

8 Claims, 19 Drawing Sheets

(56)     References Cited

FOREIGN PATENT DOCUMENTS

KR      10-2019-0133551  A      12/2019
WO      WO 2017-022890  A1      2/2017

OTHER PUBLICATIONS

Machine translation of KR 10-1998-0075096 A (Year: 1998).*
International Search Report for application No. PCT/KR2019/
008452 dated Apr. 28, 2020.

* cited by examiner

ELECTRODE TAB ALIGNMENT MECHANISM AND X-RAY INSPECTION APPARATUS COMPRISING SAME FOR INSPECTING CYLINDRICAL SECONDARY BATTERY

FIELD

The present invention relates to an X-ray inspection apparatus and method for inspecting whether a secondary battery, particularly a cylindrical secondary battery, is defective.

BACKGROUND

X-ray inspection is applied to various industrial fields, and various types of inspection devices are known according to product types in each application field. For example, an X-ray inspection apparatus may be used for defect inspection of printed circuit boards, electronic devices, and food containers or for the detection of foreign substances in food products.

In general, in an X-ray inspection apparatus, the objects to be inspected may be continuously supplied by a conveying unit such as a conveyor. An X-ray projection image is formed by an X-ray source and a detector in a shielded inspection chamber, and whether a product is defective may be determined from the X-ray projection image. In this inspection process, the X-ray needs to be shielded, and the object needs to be aligned in an appropriate orientation.

The X-ray inspection apparatus for cylindrical secondary batteries inspects the states that can represent product characteristics of a cylindrical battery such as obliqueness of "+" and "−" electrodes generated during a winding process, alignment of "+" and "−" electrodes inside the cell, and electrode gap by X-ray irradiations to determine whether or not the battery is defective.

In the X-ray inspection apparatus for a secondary battery, an inspection chamber is usually provided to form a space for shielding the X-ray, and a secondary battery is provided therein and transferred to an inspection position. X-rays are irradiated to the secondary battery at the inspection position, the image projected through the secondary battery is captured by an X-ray detector, and then, it is determined whether the secondary battery is defective through image information output from the X-ray detector.

FIG. 1 is a plan view schematically illustrating a conventional X-ray inspection apparatus for inspecting whether a cylindrical lithium-ion secondary battery is defective. Here, a secondary battery 10 is moved into a supporting groove 22a of the inspection support cylindrical body 22 by a first transporting conveyor 12, and further moved by the rotation of the inspection support cylindrical body 22 to a first inspection position where a first X-ray source 24 and a first X-ray detector 26 are installed. In the first inspection position, the first X-ray source 24 and the first X-ray detector 26 are disposed to correspond to the upper portion of the secondary battery so that, for example, an electrode gap in the upper portion of the secondary battery can be inspected. An operator determines whether there is a defect in the electrode gap of the secondary battery based on the upper image of the secondary battery transmitted to the external monitor, and inputs a removal command to a controller for the secondary battery to be removed toward a defective product transporting conveyor 32 by a defective product separator 30 if it is determined as being defective.

The secondary battery that has passed the first inspection position is moved by the rotation of the inspection support cylindrical body to a second inspection position in which a second X-ray source 34 and a second X-ray detector 36 are installed, and the lower portion of the secondary battery is inspected.

The other components shown in FIG. 1 include a first transfer guide 14, a cabinet 16, a rotary feeder 18, a pick-up groove 18a, a first rotation guide 20, an outer support guide 28, a rotary exchanger 38, a discharge groove 38a, a second rotation guide 40, a first transfer conveyor 42, a second transfer guide 44, a defective-product discharge passage 46, a rotary pusher 48, and a third transfer guide 50.

As a related prior art, Korean Registered Patent No. 10-1272556 (registered on Jun. 3, 2013) entitled 'Automatic and continuous battery inspection apparatus' is disclosed. This device relates to inspection of prismatic batteries, and comprises a disk-shaped supply unit capable of lifting/lowering and rotating, a rotating inspection unit having a rotating circular plate, and a disk-shaped discharge unit capable of lifting/lowering and rotating. The disk-shaped supply unit capable of lifting/lowering and rotating, the rotating inspection unit having a rotating circular plate, and the disk-shaped discharge unit capable of lifting/lowering and rotating are connected so as to be rotated simultaneously by one driving unit.

As another prior art, Korean Registered Patent No. 10-1707220 (registered on Feb. 9, 2017) entitled 'X-ray inspection apparatus for battery inspection and battery inspection method using the same' is disclosed. This prior art includes a guide unit that guides the transfer of the object to be inspected from one rotary unit to another rotary unit forming a rotary table structure. The rotary table structure has a plurality of engagement fixation blocks continuously engaged each other so that objects to be inspected can be fixed and transported therein. The inner bottom surface of the engagement fixation block which contacts with the object is configured as a curved surface.

As described above, in the prior art, there was no recognition that the accuracy of the X-ray projection image may be influenced by the position of an electrode tab of a cylindrical secondary battery, and thus, a method or device for increasing the accuracy of the defect inspection by controlling the position of the electrode tab could not be presented.

DETAILED DESCRIPTION OF THE INVENTION

Problem to be Solved

Cylindrical secondary batteries generally include an electrode assembly in which a positive electrode plate coated with a positive electrode active material, a negative electrode plate coated with a negative electrode active material, and a separator positioned between the positive electrode plate and the negative electrode plate are wound together, a case for housing the electrode assembly, and an electrolyte that is injected into the case to allow lithium ions to move.

Referring to FIG. 2A, an electrode assembly 90 is manufactured by staking a positive electrode plate 110 coated with the positive electrode active material and connected to the positive electrode tab 111, a negative electrode plate 120 coated with the negative electrode active material and connected to the negative electrode tab 121, and a separator 130, and then, winding them around a winding shaft 140. As shown in FIG. 2C, a cylindrical secondary battery 100 is manufactured by casing the electrode assembly 90 within an upper insulating plate 142, a lower insulating plate 143, and a cylindrical can 144. In this process, the winding shaft 140 may be removed and a core member 141 may be inserted. In the manufacturing process, the positive electrode tab 111 and the negative electrode tab 121 are connected to corresponding positions above and below the electrode assembly (see FIG. 2B) or at least to the same side of the electrode assembly (see FIG. 2C).

The accuracy of the defect inspection may vary depending on the direction in which the X-ray is irradiated to the cylindrical battery. For example, when X-rays are irradiated to a portion where the electrode tabs of a cylindrical battery are joined, distortion may occur in the X-ray image due to interference of the electrode tabs.

FIG. 3A illustrates an example of an X-ray projection image irradiated to a portion of the negative electrode tab 121 located under the battery (refer to area "A" in FIG. 2C). It can be seen that some distorted images appear at the bottom of the image. This image shows an image distortion caused by the interference of the negative electrode tab or the negative electrode tab welding portion at the bottom of the battery. As shown in the drawing, the electrode alignment 150, the separator gap 152, and the gap 154 between the electrodes are distorted. When such a poor X-ray projection image is obtained, it is difficult to identify the defect. In this case, the object to be inspected may have to be reinspected or classified as defective, resulting in a waste of time and cost.

On the other hand, when X-rays are irradiated to a portion where the electrode tabs are not connected, a good image without distortion can be obtained. FIG. 3B is a projection image when X-rays are irradiated on a dotted line indicated by "B" in FIG. 2C, and it can be seen that a clean image without distortion is obtained.

In this way, when X-rays are irradiated to a portion which does not contain the junction of the positive electrode tab or the negative electrode tab, interference during X-ray projection is minimized, and thus the accuracy of defect inspection is highest.

Accordingly, an object of the present invention is to irradiate X-rays to a preferable position or orientation of a cylindrical secondary battery when it reaches an X-ray source although it is initially introduced into the X-ray inspection apparatus at an arbitrary position or orientation.

SUMMARY OF THE INVENTION

The X-ray inspection apparatus for a cylindrical secondary battery according to the present invention for achieving the object as described above includes the following aspects and any combination thereof.

In one aspect of the present invention, an X-ray inspection apparatus for a cylindrical secondary battery comprises an inspection chamber, a transfer unit for transferring the cylindrical secondary battery into the inspection chamber, an inspection body for moving the secondary battery held thereon, an X-ray source, an X-ray detector, and a discharge unit for discharging inspected secondary battery to outside of the inspection chamber, wherein the X-ray inspection apparatus further comprising an alignment mechanism arranged along a moving path of the inspection body to align the cylindrical secondary battery.

Another aspect of the present invention is an X-ray inspection apparatus for a cylindrical secondary battery, wherein the inspection body is a rotational inspection body that rotates circularly.

Another aspect of the present invention is an X-ray inspection apparatus for a cylindrical secondary battery, wherein the cylindrical secondary battery has an electrode tab protruding at its upper end, and the alignment mechanism is configured to align the electrode tab.

Another aspect of the present invention is an X-ray inspection apparatus for a cylindrical secondary battery, wherein the inspection body has a plurality of supporting grooves provided around the inspection body at a regular interval, and the supporting groove holds the secondary battery with an adhesive force.

Another aspect of the present invention is an X-ray inspection apparatus for a cylindrical secondary battery, wherein the alignment mechanism includes at least one sensing unit for detecting a position of a specific portion of the cylindrical secondary battery, and at least one contact unit operable between a standby position incapable of contacting with the secondary battery and a contact position capable of contacting with the secondary battery.

Another aspect of the present invention is an X-ray inspection apparatus for a cylindrical secondary battery, wherein the contact unit is configured to be operated based on a detection result of the sensing unit, and when the contact unit is operated to the contact position, the secondary battery can be turned by a contact frictional force generated between the secondary battery and the contact unit while the secondary battery continues to move with the transfer unit.

Another aspect of the present invention is an X-ray inspection apparatus for a cylindrical secondary battery, wherein the contact unit includes a contact pad, and the contact pad has a contact surface contacting with the cylindrical secondary battery.

Another aspect of the present invention is an X-ray inspection apparatus for a cylindrical secondary battery, wherein a turning angle of the cylindrical secondary battery is determined by a length of the contact surface.

Another aspect of the present invention is an X-ray inspection apparatus for a cylindrical secondary battery, wherein the transfer unit is configured to intermittently pitch-rotate in an order of rotation-stop-rotation, and the sensing unit is configured to detect the secondary battery when the transfer unit is in a stop operation during the pitch-rotation.

Another aspect of the present invention is an X-ray inspection apparatus for a cylindrical secondary battery, wherein the sensing unit and the contact unit are alternately arranged along the moving path of the inspection body.

The cylindrical object alignment mechanism according to the present invention for achieving the object as described above includes the following aspects and any combination thereof.

One aspect of the present invention is an alignment mechanism for aligning a cylindrical object being moved by a conveying unit moving with the object placed thereon, comprising a sensing unit for detecting a position of a specific portion on the object, and a contact unit operable between a standby position incapable of contacting with the object and a contact position capable of contacting with the object, wherein the sensing unit and the contact unit are arranged along a moving path of the conveying unit, and wherein the contact unit is configured to be operated based on a detection result of the sensing unit, and when the contact unit is operated to the contact position, the object can be turned by a contact frictional force generated between the object and the contact unit while the object continues to move with the conveying unit.

Another aspect of the present invention is an alignment mechanism for aligning a cylindrical object, wherein the contact unit includes a contact pad, and the contact pad has a contact surface contacting with the cylindrical object.

Another aspect of the present invention is an alignment mechanism for aligning a cylindrical object, wherein a turning angle of the cylindrical object is determined by a length of the contact surface.

Another aspect of the present invention is an alignment mechanism for aligning a cylindrical object, wherein the conveying unit is configured to intermittently pitch-move in an order of movement-stop-movement.

The method for aligning a cylindrical object according to the present invention for achieving the object as described above includes the following aspects and any combination thereof.

One aspect of the present invention is a method for aligning a cylindrical object being moved by a conveying unit moving with the object placed thereon, using an alignment mechanism including a sensing unit for detecting a position of a specific portion on the object and a contact unit operable between a standby position incapable of contacting with the object and a contact position capable of contacting with the object, comprising conveying a cylindrical object using the conveying unit, detecting a position of a specific portion on the cylindrical object using the sensing unit, determining whether to operate the contact unit based on an information of a location of the specific portion sensed by the sensing unit, actuating the contact unit to the contact position when the contact unit is determined to be operated, and turning the cylindrical object by a contact frictional force generated between the object and the contact unit by continuously moving the conveying unit after the object thereon contacts with the actuated contact unit.

Another aspect of the present invention is a method for aligning a moving cylindrical object, wherein the cylindrical object is a secondary battery, and the specific portion is an electrode tab protruding at an upper end of the secondary battery.

Another aspect of the present invention is a method for aligning a moving cylindrical object, wherein the contact unit includes a contact pad, and the contact pad has a contact surface contacting with the cylindrical object.

Another aspect of the present invention is a method for aligning a moving cylindrical object, wherein a turning angle of the cylindrical object is determined by a length of the contact surface.

Another aspect of the present invention is a method for aligning a moving cylindrical object, wherein the conveying unit is configured to intermittently pitch-rotate in an order of rotation-stop-rotation, and the sensing unit is configured to detect the secondary battery when the conveying unit is in a stop operation during the pitch-rotation.

Effect of the Invention

It is prevented that inaccurate X-ray projection images are obtained.

By lowering the likelihood that the object to be inspected may be reinspected or classified as defective, the accuracy and efficiency of X-ray examination are increased, and thus the waste of time and cost can be minimized.

BRIEF DESCRIPTION OF THE DRAWINGS

FIG. 3A illustrates a distorted X-ray projection image, and FIG. 3B illustrates a good X-ray projection image.

FIG. 9A shows a state in which the contact unit is extended to a contact position before the battery is aligned with the contact unit, FIG. 9B shows a state in which the battery is in contact with the contact unit at an initial contact point, FIG. 9C shows a state in which the battery is turned in contact with the contact unit, FIG. 9D shows a state in which the battery is in contact with the contact unit at a final contact point, and FIG. 9E shows a state in which the battery has passed through the contact unit.

DETAILED DESCRIPTION OF EMBODIMENTS

Figure 1:
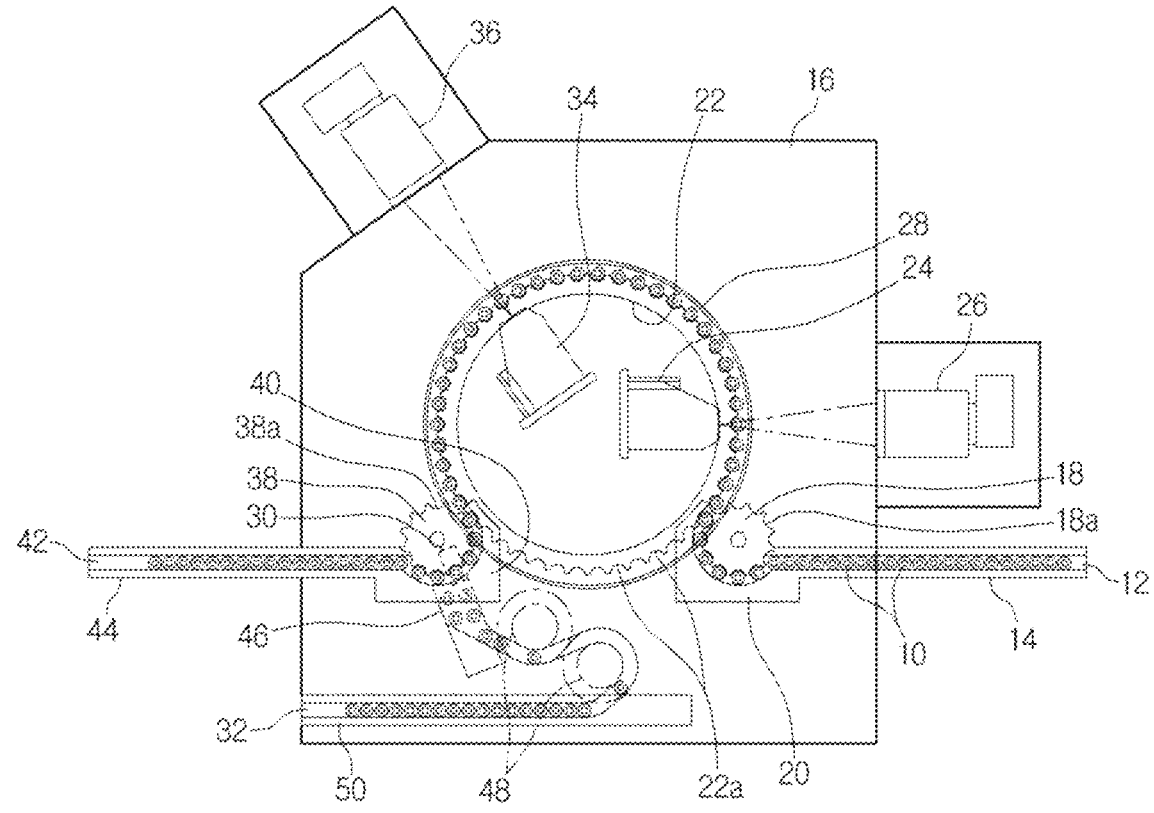
FIG. 1 is a plan view of an X-ray inspection apparatus according to the prior art.

The embodiments shown in the accompanying drawings are for a clear understanding of the present invention, and the present invention is not limited thereto. In the following description, components having the same reference numerals in different drawings have similar functions, so they are not described repeatedly unless necessary for understanding of the invention. Well-known components are briefly described or omitted; however, it should not be understood as being excluded from the embodiments.

For clarity of explanation of the present invention, terms are defined as follows.

"Rotation": A motion in which an object to be inspected in a supporting groove of the rotational inspection body approaches or moves away from components such as an X-ray source as a rotational inspection body 220 rotates. In other words, a motion in which an object rotates about the center of the rotational inspection body. Rotation is denoted as "R" in FIGS. 7, 9, and 10.

"Pitch-rotation": A motion in which an object such as the rotational inspection body 220 intermittently rotates in the order of rotation-stop-rotation.

"Turning": A motion in which an object to be inspected revolves within the supporting groove 222 of the rotational inspection body 220. That is, a motion in which the cylindrical object to be inspected 100 revolves around its own center. Turning is denoted as "T" in FIGS. 9C and 10.

"Turning distance": The circumferential distance that a cylindrical object to be inspected has turned.

"Turning angle": The angle that a cylindrical object to be inspected has turned.

"Detection alignment position": The position at which a pitch-rotating object to be inspected is stopped so that it can be detected by a sensing unit.

Hereinafter, exemplary embodiments of the present invention will be described in detail with reference to the accompanying drawings.

Figure 4A:
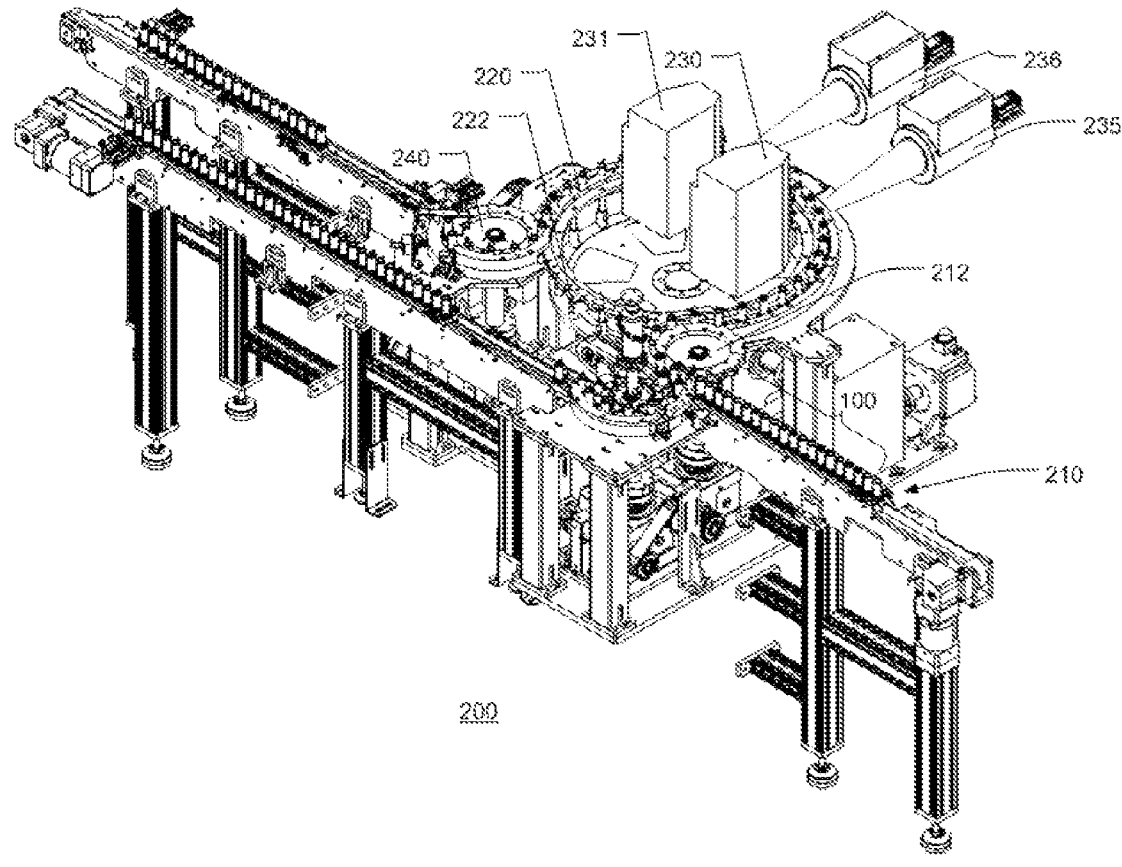
FIGS. 4A and 4B are a perspective view and a plan view, respectively, illustrating an embodiment of an X-ray inspection apparatus in which an electrode tab alignment mechanism is not installed.
Figure 4B:
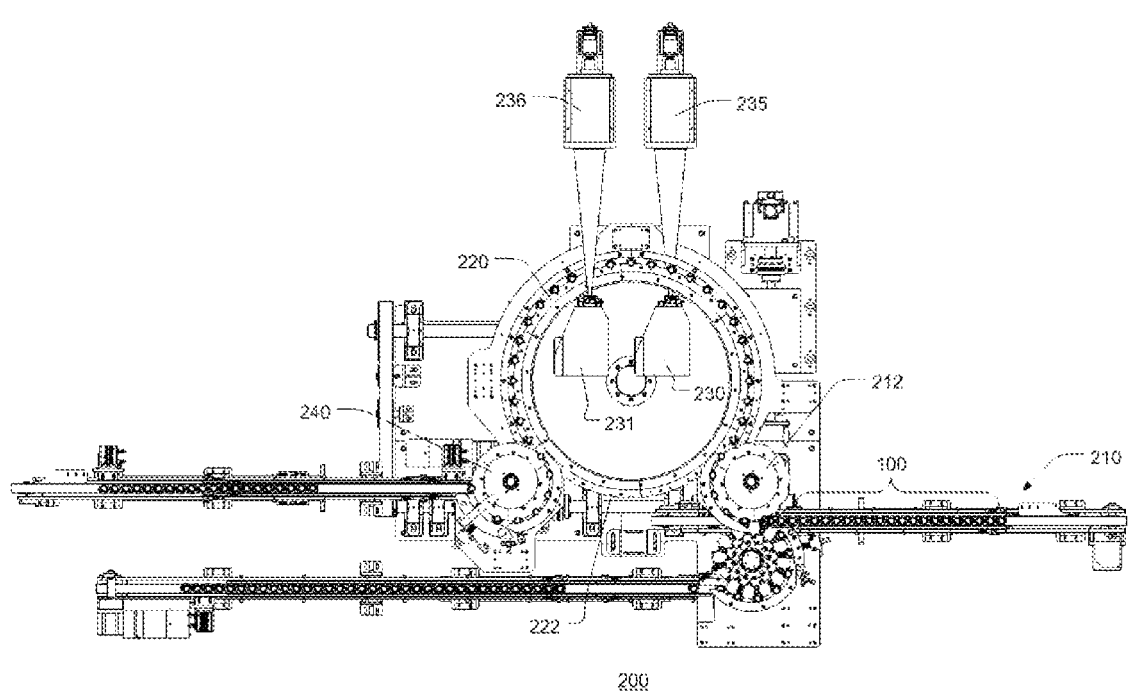

FIGS. 4A and 4B illustrate an embodiment of the X-ray inspection apparatus 200 in which the electrode tab alignment mechanisms 250 and 270 are not installed.

The X-ray inspection apparatus 200 includes a transporting conveyor 210 and a rotary feeder 212 for introducing the object 100 into an inspection chamber (not shown), a rotational inspection body 220 for transferring the object to the inspection position, an X-ray source 230, 231 that irradiates an X-ray onto the object, an X-ray detector 235, 236 that detects an image projected when the X-ray passes through the object to be inspected, and a rotary discharger 240 that discharges the examined object.

Referring to FIGS. 4A and 4B, two X-ray sources 230 and 231 may be disposed to be spaced apart from each other in the rotational inspection body 220, and detectors 235 and 236 for obtaining images from the projected X-rays by each of the X-ray sources 230 and 231 may be disposed outside the rotational inspection body 220. The X-ray source and the detector may be arranged in opposite positions. Each of the X-ray sources 230 and 231 may irradiate X-rays at different heights of the battery. For example, as shown in FIGS. 4A and 4B, the first X-ray source 230 may irradiate X-ray to the lower part of the battery, and the second X-ray source 231 may irradiate X-ray to the upper part of the battery.

The number of X-ray sources and detectors is not particularly limited and may be determined according to the size of a battery to be inspected. In addition, an arrangement interval of different X-ray sources may be appropriately determined according to an arrangement space of the X-ray sources. The inspection result of the battery may be stored, and whether each battery is normal (good) or defective (not good) may be stored. In addition, the battery for which the inspection has been completed may be discharged by the rotary discharger 240.

Figure 5A:
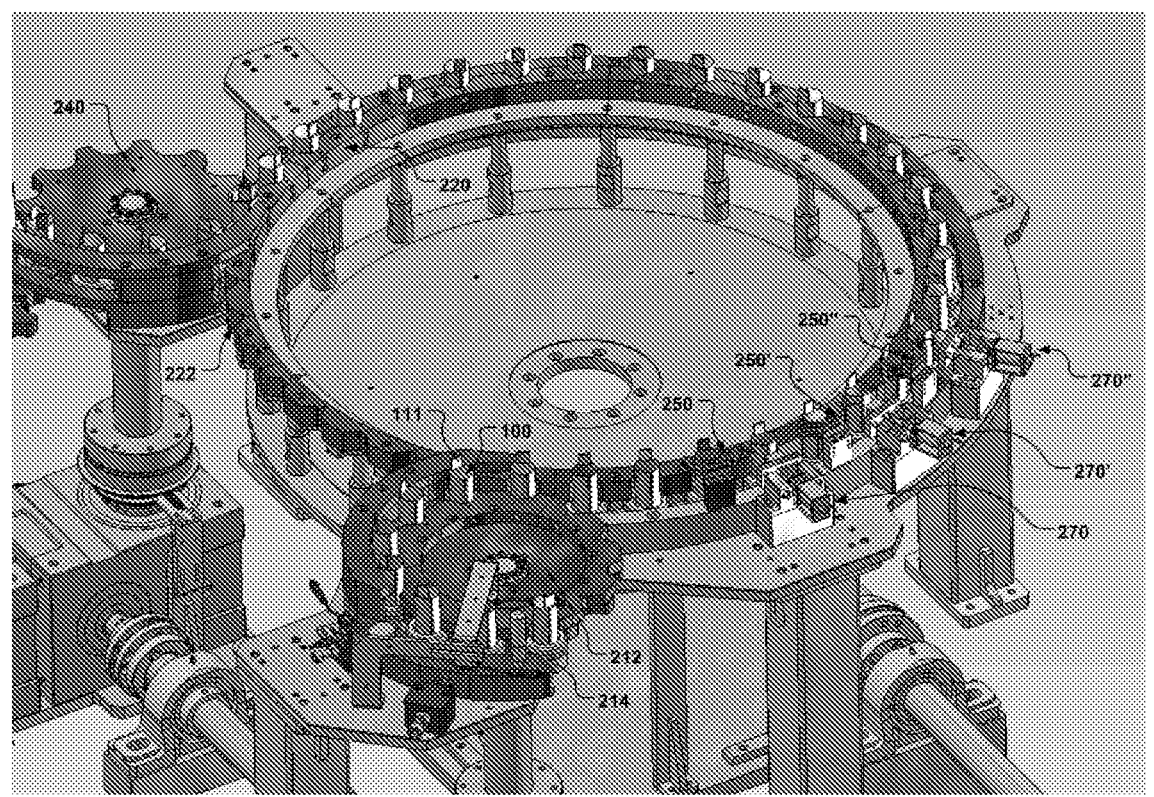
FIG. 5A is a perspective view showing a state in which an electrode tab alignment mechanism according to an embodiment of the present invention is installed on the apparatus of FIGS. 4A and 4B.
Figure 5B:
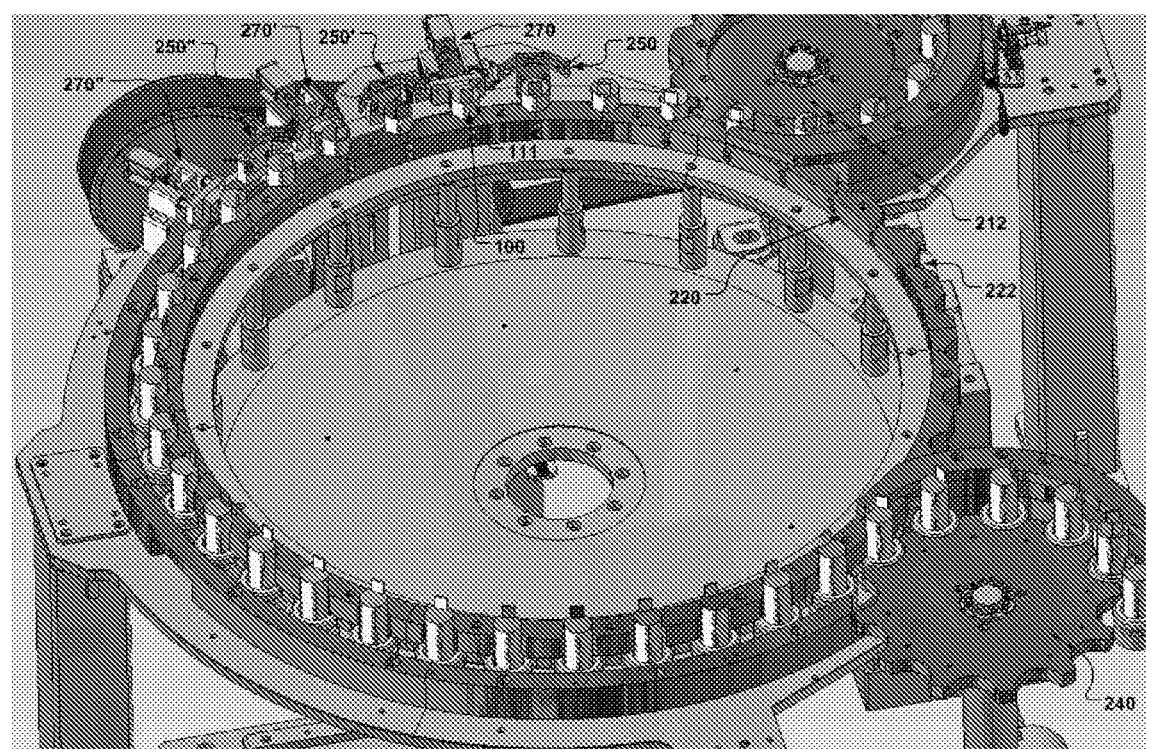
FIG. 5B is its perspective view illustrated in a direction opposite FIG. 5A.

FIGS. 5A and 5B illustrate electrode tab alignment mechanisms 250 and 270 according to an embodiment of the present invention, that is, a sensing unit 250 for sensing an object to be inspected and a contact unit 270 for turning the object to be inspected installed onto the X-ray inspection apparatus of FIG. 4. In FIGS. 5A and 5B, configurations of the transporting conveyor, the X-ray source, the X-ray detector, and the like are omitted in order to show the objects 100 introduced into the inspection apparatus, the sensing unit 250, and the contact unit 270 in more detail. FIGS. 5A and 5B are viewed from opposite directions.

Referring to FIGS. 5A and 5B, a cylindrical secondary battery 100 to be inspected is transferred to the rotary feeder 212 while seated in a holder 214, and subsequently, accommodated into a supporting groove 222 of the rotational inspection body 220. Here, the cylindrical secondary battery 100, which is the object of the inspection, is in a state before the upper cap is covered on the jelly roll battery inserted in the can, as in general X-ray inspection, and an electrode tab 111 or 121 protrudes at the top (see FIG. 2C). The battery may be a two-tab type.

The supporting groove 222 may have a shape corresponding to the cylindrical body of the battery, and may be made of a magnetic material or include a magnetic material, so that the object to be inspected is attached to the supporting groove 222 by magnetic force. It would be possible for an appropriate adhesive force other than magnetic force to act. Batteries advancing to be accommodated in the supporting groove 222 of the rotational inspection body 220 may be turned in the holder 214 for various reasons, so the position of the upper tab 111 is not constant.

Thereafter, the cylindrical secondary batteries 100 to be inspected are transferred to the position where the first X-ray source 250 is irradiated via the sensing unit 250 and the contact unit 270 as the rotational inspection body 220 rotates.

By selective operation of the sensing unit 250 and the contact unit 270 as exemplarily described below, the upper electrode tabs 111 of the input secondary batteries are aligned before reaching the X-ray source. In FIGS. 5A and 5B, electrode tabs are illustrated, for convenience, in a constant orientation regardless of whether or not they are aligned by the sensing unit and the contact unit.

When the secondary battery 100 is input through the rotary feeder 212, the first sensing unit 250 detects the position of the upper electrode tab 111. As a result of the detection, if the tab 111 is required to be aligned, the first contact unit 270 operates to turn the battery 100. Thereafter, according to the detection result of the second sensing unit 250' and the third sensing unit 250", when additional alignment is required, the second contact unit 270' or the third contact unit 270" may be operated.

In this embodiment, three sensing units and three contact units, respectively, are installed, but they can be installed in an appropriate number depending on the circumference of the secondary battery 100, the spacing between the supporting grooves 222, or the length of a contact pads 272 (see FIG. 8), etc.

Figure 6:
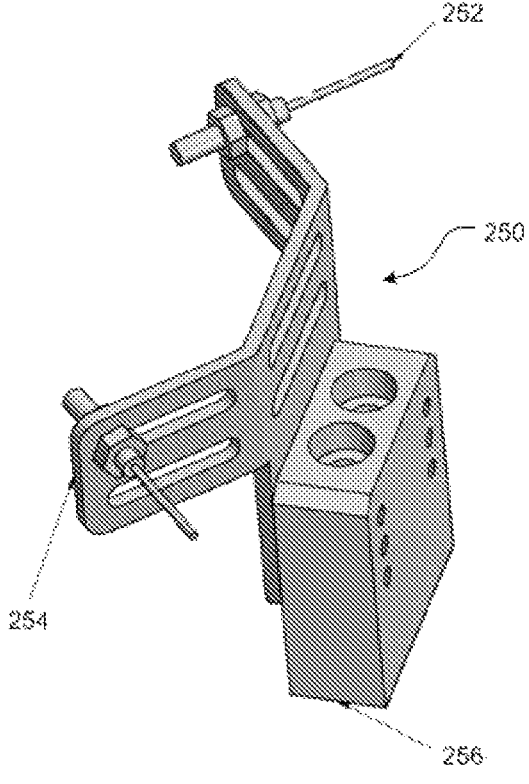
FIG. 6 shows an embodiment of a sensing unit installed on an X-ray inspection apparatus according to the present invention.

FIG. 6 shows an embodiment of the sensing unit 250 mounted on the X-ray inspection apparatus according to the present invention.

Referring to FIG. 6, the sensing unit 250 may include a sensor 252, a sensor bracket 254 for fixing the sensor, and a sensor support block 256 for installing the sensor bracket 254 on the inspection apparatus 200. As the sensor, a reflective laser sensor is preferable.

A method of sensing the position of the upper tab 111 of the cylindrical secondary battery 100 by the sensing unit 250 will be described in detail with reference to FIG. 7.

Among the lines passing through the center of the circle 160 defining the upper surface of the cylindrical battery 100, a line L1 parallel to the line connecting the two contact points of the rotational inspection body 220 and the circle 160, and a line L2 perpendicular thereto can divide the circle 160 into quadrants. During rotation (R) of the rotational inspection body 220, two sensors 252 and 252' may be disposed to detect the presence or absence of the electrode tab 111 in the quadrant indicated by an angle "α" among the above quadrants.

The mounting angle of sensor 252 to the sensing unit 250 may be a determined by various conditions, such as the target detection range of the sensing unit 250, for example, whether it covers the entire angle "α" of the circle 160, or the distance from the rotational inspection body 220, sensor performance, etc. In addition, the sensor 252 may determine how far the tab is within the sensing range using the reflected wave reflected by the tab 111.

Figure 7:
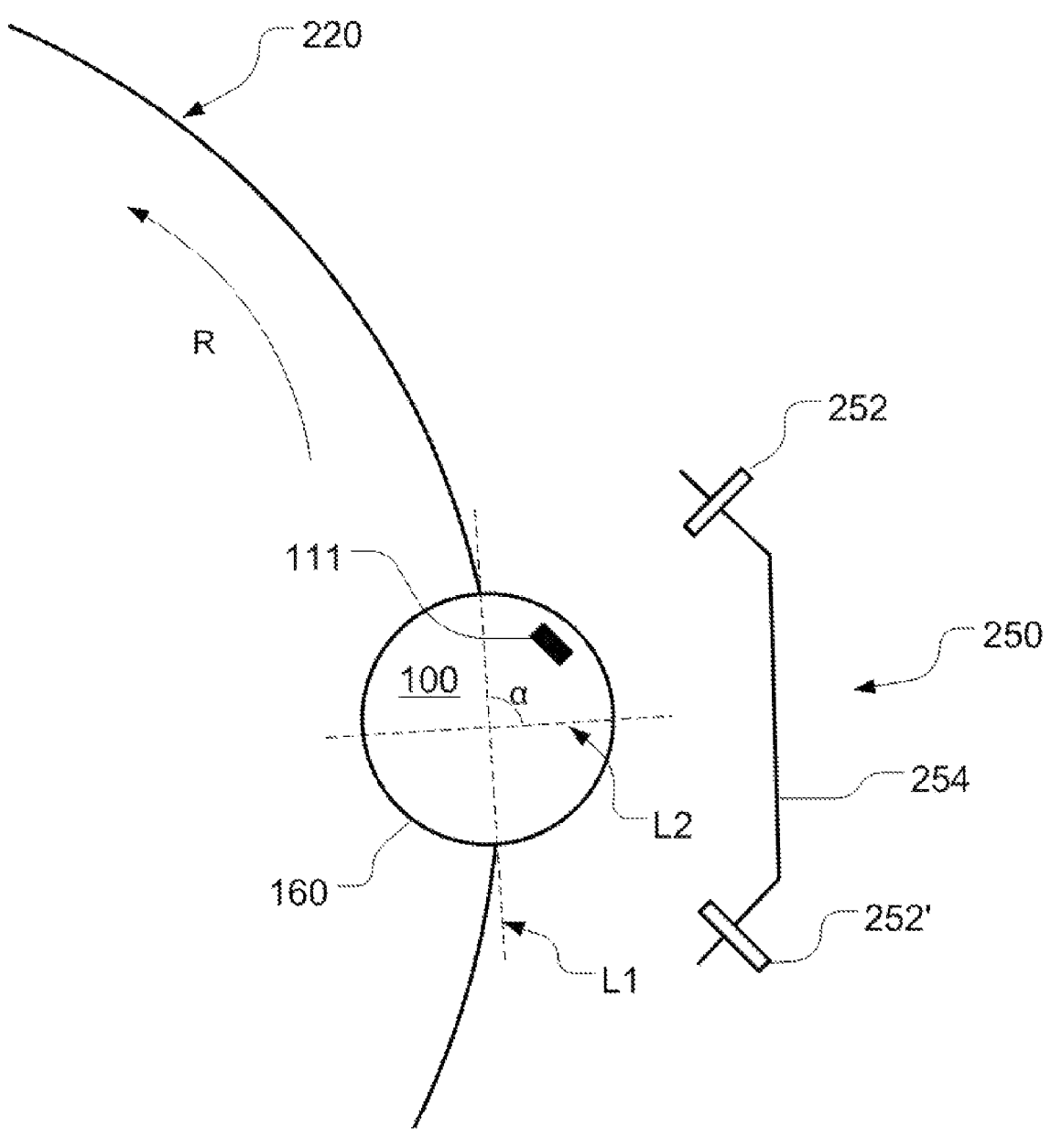
FIG. 7 is a conceptual diagram illustrating a configuration in which the sensing unit detects a cylindrical secondary battery to be inspected.

In FIG. 7, the sensor 252 is installed to detect the presence or absence of the electrode tab 111 within the angle "α". A sensor 252' may be installed to correct a detection error that may occur when the sensor 252 detects an electrode tab at a point outside the angle "α". When the object to be inspected reaches the detection alignment position, detection by the sensors 252 and 252' is performed.

Figure 10:
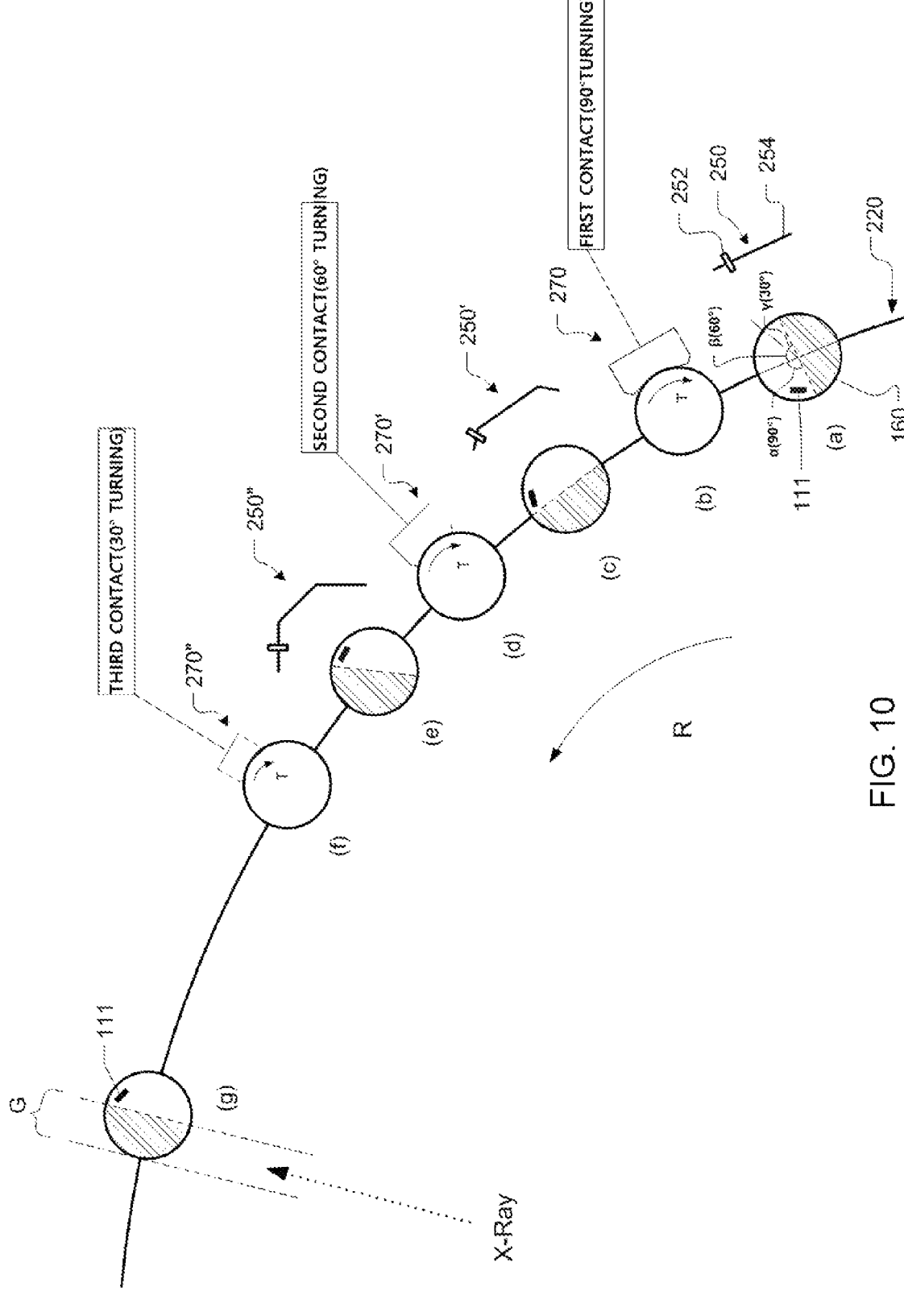
FIG. 10 is a conceptual diagram illustrating a mechanism for sensing and turning secondary batteries introduced into the X-ray inspection apparatus according to the present invention.

In FIGS. 6 and 7, it is shown that the sensor 252 is mounted vertically or at a certain angle to the sensor bracket 254 having both ends inwardly angled, but the sensor bracket 254 may be in the form of a flat plate, or the angle of bending of the bracket 254 may be determined differently as necessary (see FIG. 10). It is also possible for the sensor to be installed on the bracket at any other angle. In addition, the calibration sensor 252' is not essential and may be optionally employed.

The sensing unit 250 is installed at a position spaced apart from the rotational inspection body 220, and detects the position, posture, or orientation of the object to be inspected 100 transported by the rotational inspection body, as well as other configuration characteristics of the battery. Of course, the sensing unit 250 will be disposed upstream of the X-ray sources 230 and 231 in the rotation (R) direction, that is, before the object to be inspected reaches the X-ray source. Two or more sensing units may be arranged along the transport direction in consideration of the angle range to be detected, the type of sensor employed, the detection method, and the turning angle of the contact unit 270 which will be described later.

For example, as shown in FIG. 10, three sensing units 250, 250', 250" may be installed along the direction of transport (i.e., rotation "R" direction) in order to continuously detect a range of 90 degrees "α", a range of 60 degrees "β", and a range of 30 degrees "γ".

Figure 8:
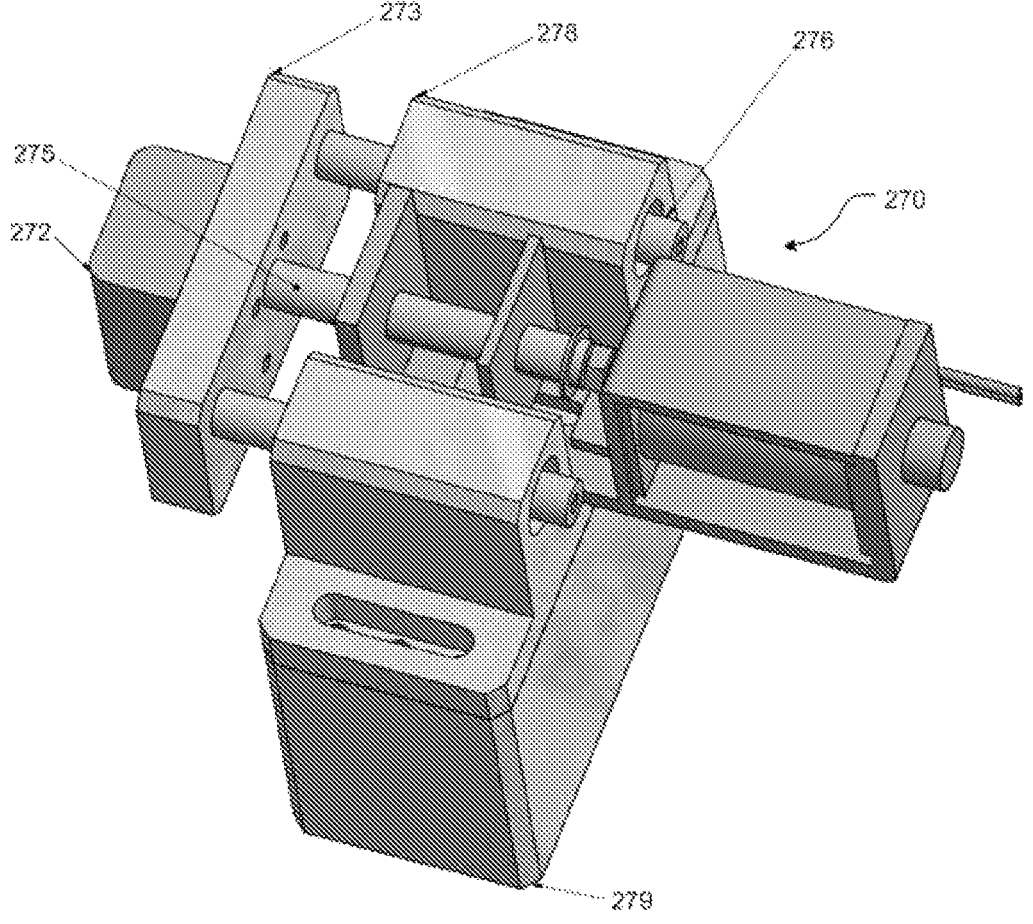
FIG. 8 shows an embodiment of a contact unit installed on an X-ray inspection apparatus according to the present invention.

FIG. 8 shows an embodiment of a contact unit 270 according to the present invention.

Referring to FIG. 8, the contact unit 270 according to the present invention includes a contact pad 272, a pad plate 273, a lock shaft 275, a linear motion shaft 276, a bush block 278, and a spacer block 279. The contact pad 272 may be made of a material such as a urethane material suitable for turning the object to be inspected by contacting the object to be inspected 100. The contact pad 272 may have a concave shape to match the cylindrical case 144 of the cylindrical battery 100.

When a contact command is received as a result of detection by the upstream sensing unit 250, the contact unit 270 turns the object to be inspected 100 according to a method described hereinafter with reference to FIGS. 9A to 9E.

FIGS. 9A to 9E are conceptual diagrams showing the mutual positions of the cylindrical battery 100 rotating "R" together with the rotational inspection body 220 and the contact pad 272 of the contact unit 270.

Figure 9A:
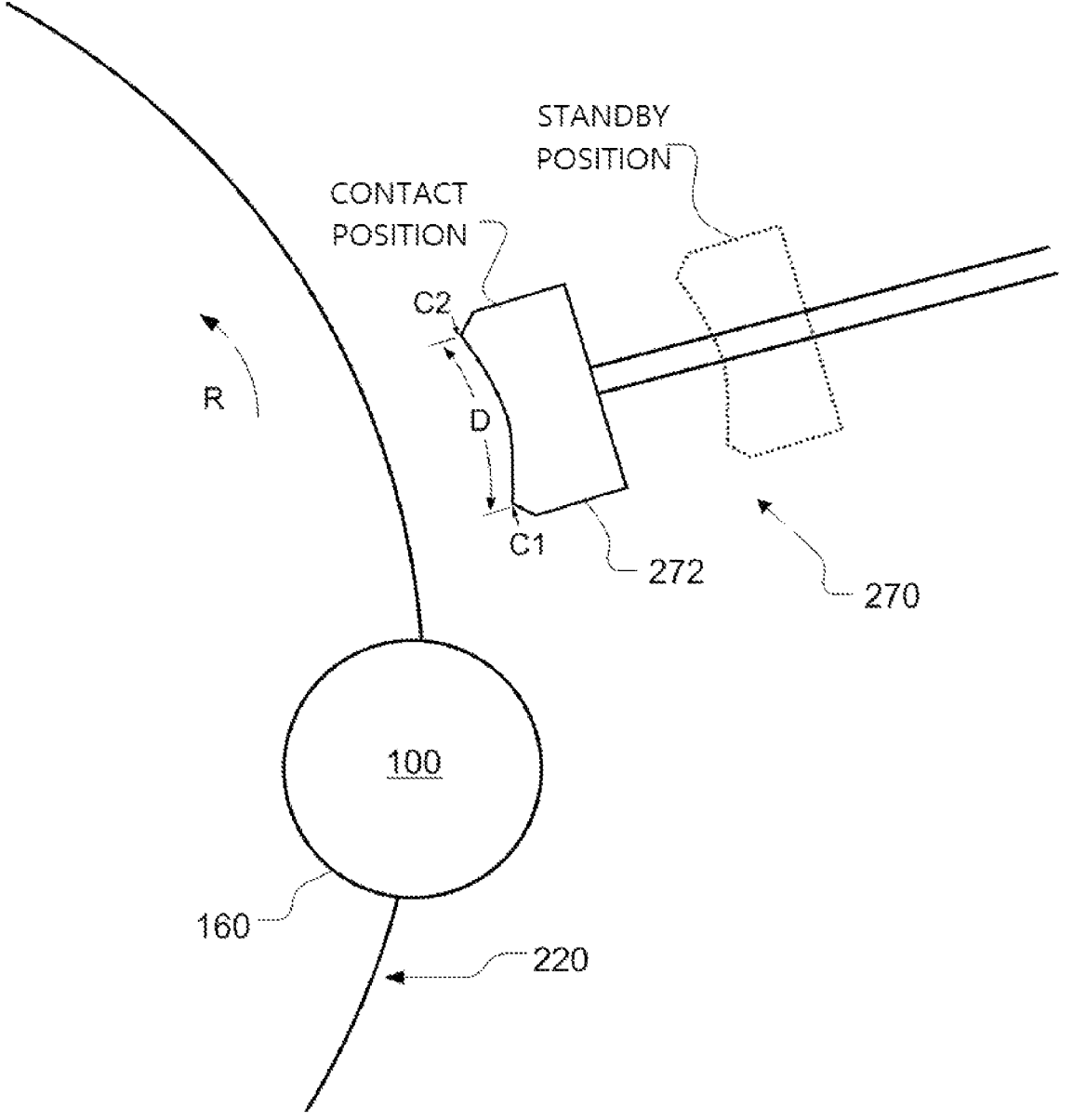
FIGS. 9A, 9B, 9C, 9D, and 9E are conceptual diagrams showing a configuration in which the contact unit turns a cylindrical secondary battery to be inspected. As a rotational inspection body rotates.

When a contact command is received according to the detection result of the sensing unit 250, the contact unit 270 is operated by a motor or any other appropriate actuator so that the contact pad 272 extends to a contact position in which it comes to adjoin the movement trajectory of the cylindrical battery 100 before the corresponding battery 100 starts to pitch-rotate from the detection position or reaches the contact position (see FIG. 9A). This contact position is set to a position in which the battery in the supporting groove 222 of the rotational inspection body 220 can be turned by a contact friction force overcoming the adhesive force to the supporting groove, for example, magnetic force. Whether or not the contact pad operates, an operation speed, an operation timing, and the like may be set by a controller (not shown).

The contact pad 272 may have a concave contact surface which contacts with the object to be inspected, as described above. In addition, both corners of the contact pad 272 may be chamfered so that no bump occurs until the initial contact point C1 on the contact pad 272 is contacted when the cylindrical battery enters, and also, no bump occurs after the battery passes the final contact point C2.

Figure 9B:
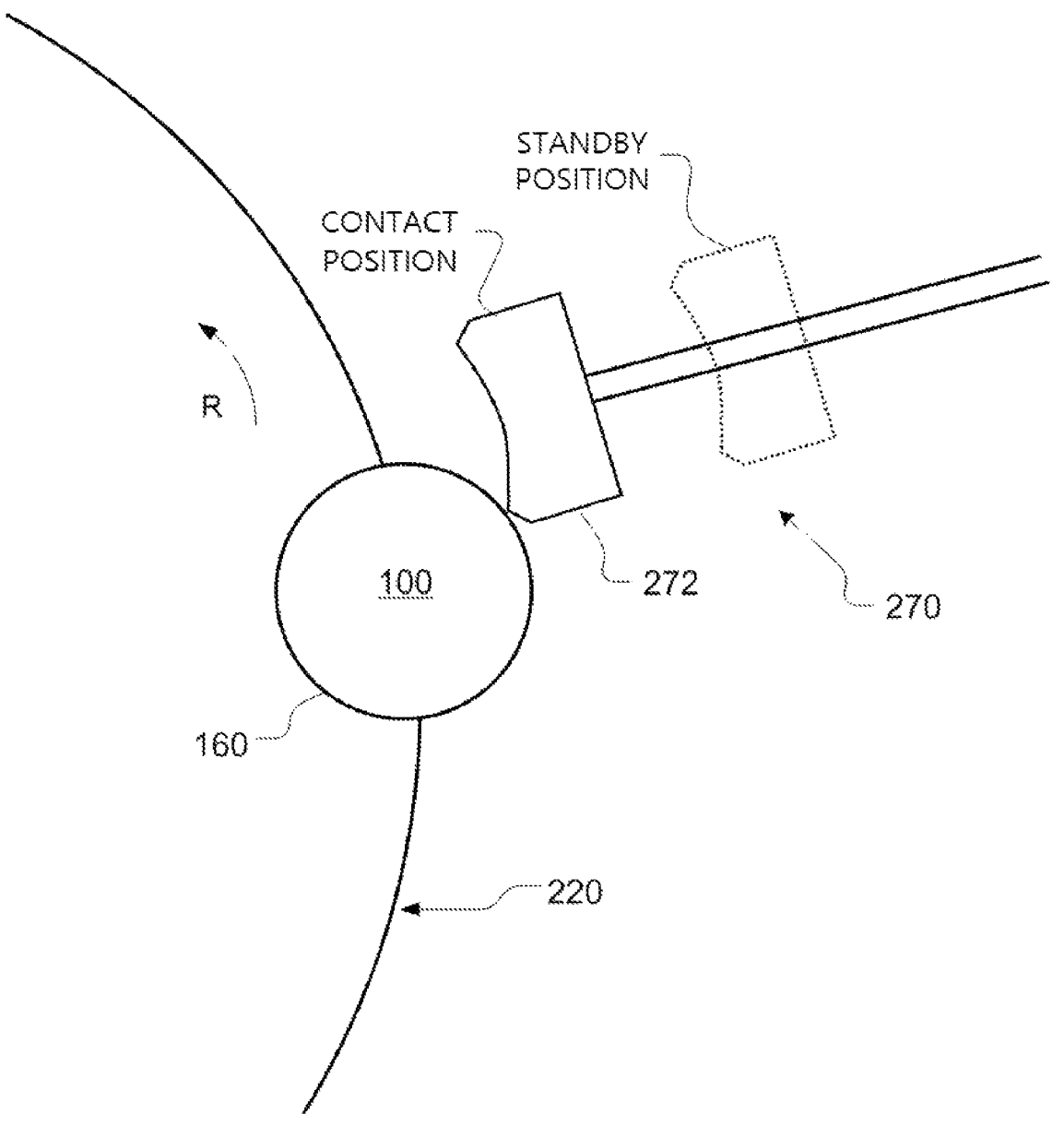
Figure 9C:
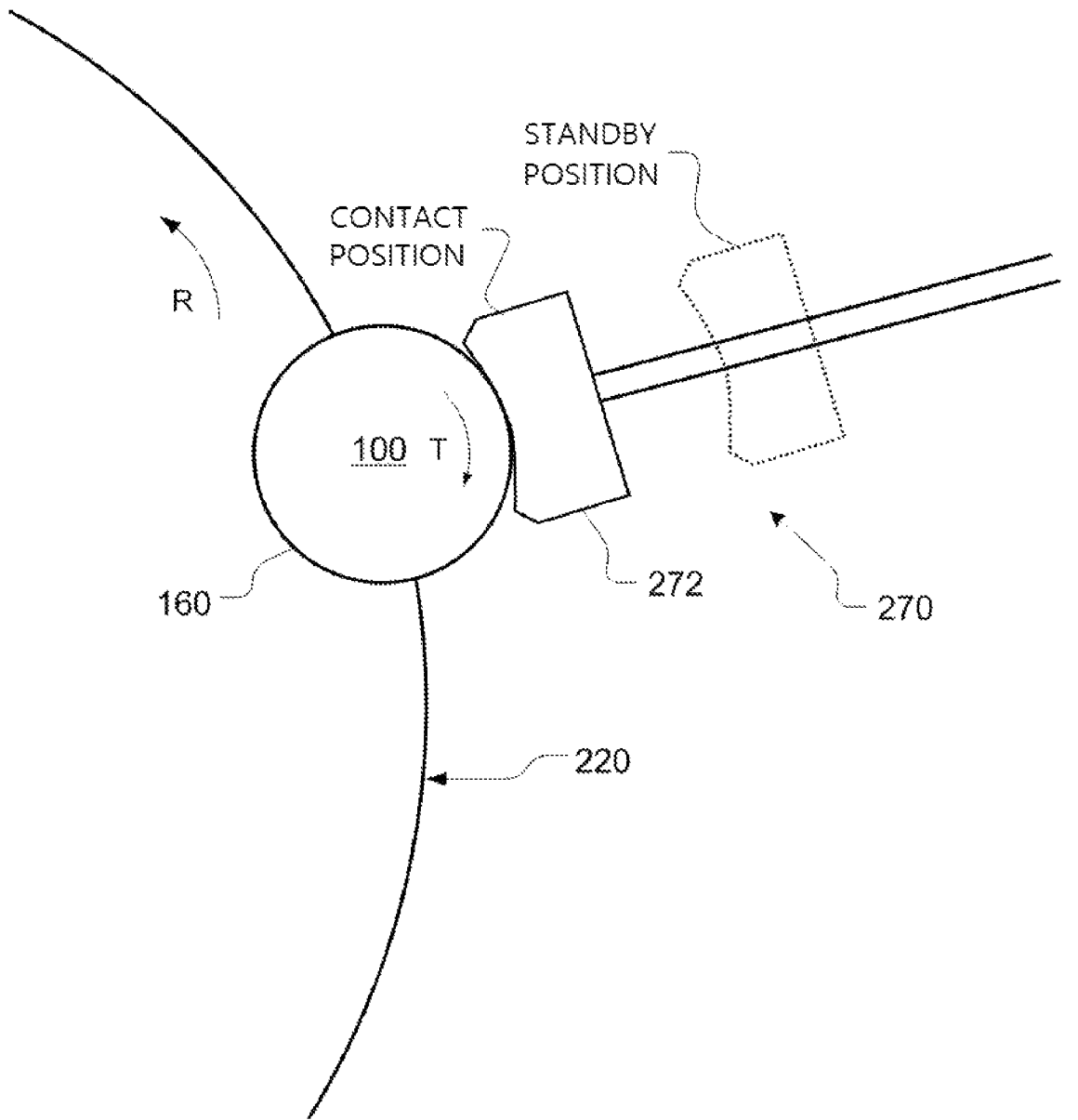

The cylindrical battery 100 rotates and starts turning from the initial contact point C1 (FIG. 9B).

Figure 9D:
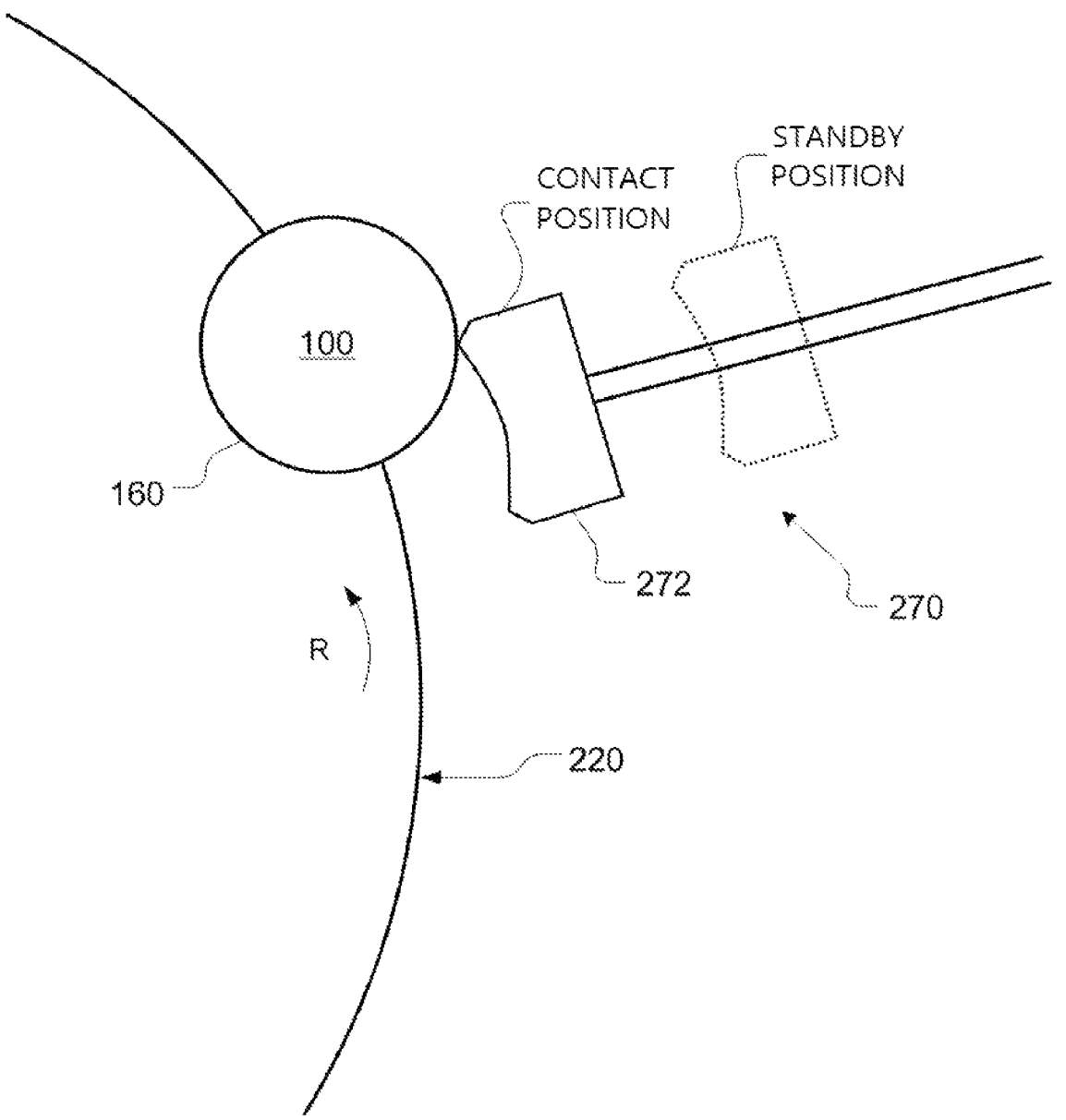
Figure 9E:
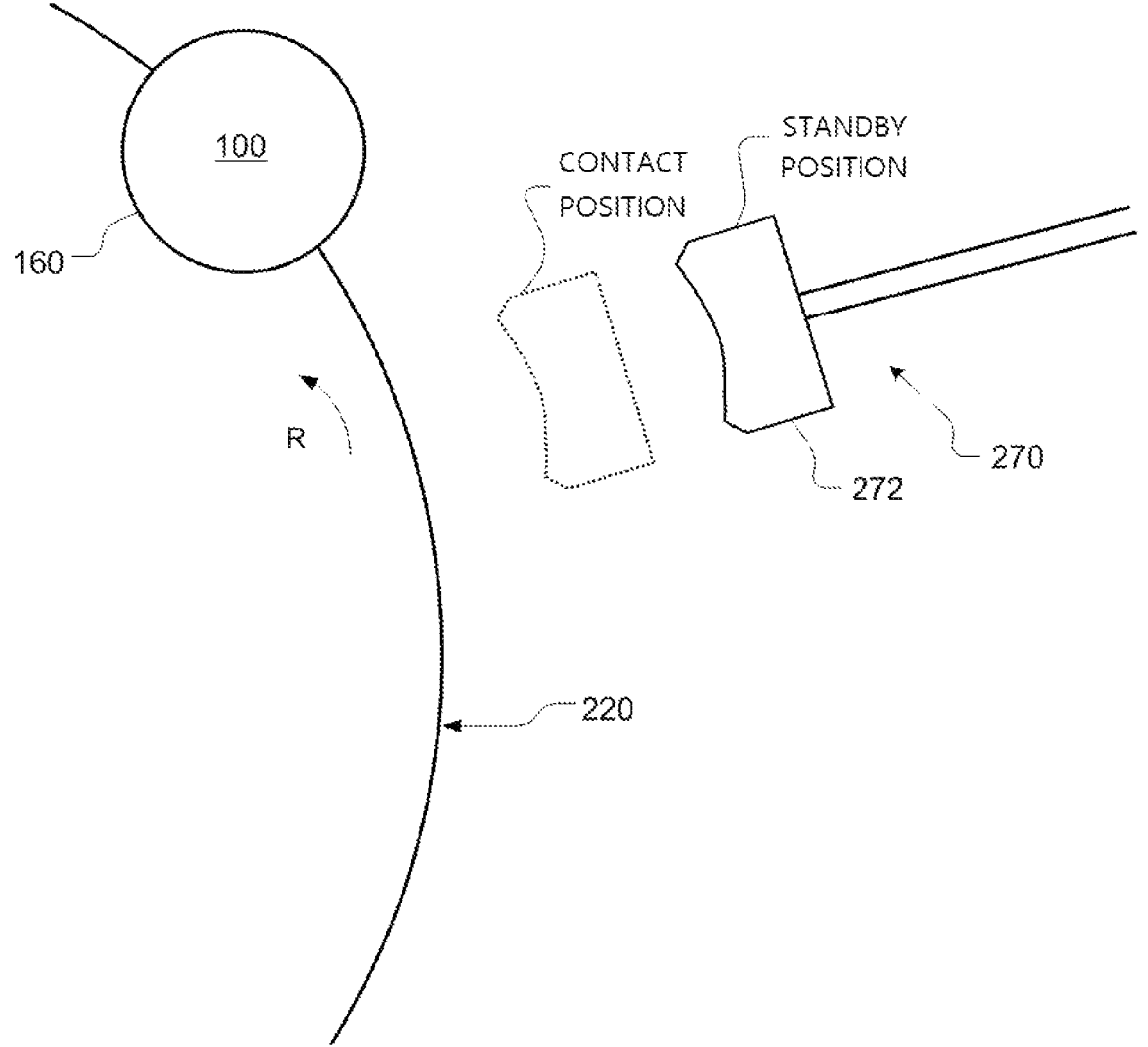

The rotational inspection body 220 continues to rotate until the cylindrical battery 100 leaves the final contact point C2 (FIG. 9D). After that, the contact pad 272 of the contact unit returns to the standby position (see FIG. 9E). After the battery is turned to the final contact point C2, it is rotated without additional turning due to adhesive force (e.g., magnetic force) within the supporting groove 222.

In this case, the turning distance or turning angle of the cylindrical battery 100 corresponds to the contact length "D" of the contact pad 272. Therefore, the turning angle of the cylindrical battery can be determined by adjusting the contact length "D". For example, if the cylindrical battery is a 21700-battery type, it has the diameter of 21 mm and the circumference of about 65.94 mm. Thus, the turning distance of 65.94 mm corresponds to the turning angle of 360 degrees. Therefore, in order to obtain a turning angle of 90 degrees, the contact length "D" of the contact pad 272 may be configured to be 16.485 mm, which is a quarter of the circumference. The contact pad 272 may be configured to be detachable.

The contact unit 270 is disposed upstream of the X-ray source in the transport direction, that is, before the object to be inspected reaches the X-ray sources 230 and 231, and is disposed downstream of the sensing unit 250. For example, the contact unit 270 may be disposed near a stop position immediately next to the stop position (i.e., a detection alignment position) in which a pitch-rotating battery is detected by the sensing unit 250. As long as it is ensured that the sensing operation precedes the contact operation for one secondary battery, it will be possible to arrange the sensing unit downstream of the contact unit.

If necessary, two or more contact units may be arranged along the transport direction. For example, three pairs of sensing units and contact units may be arranged along the transport direction (see FIGS. 5A, 5B and 10). The number of sensing units and contact units is not necessarily the same. For example, it may be possible to detect the position of the upper tab 111 with one sensing unit and then continuously operate two or more contact units to achieve a desired turning angle. It may be required to arrange two or more contact units since the turning angle that can be achieved by one contact with the contact unit may be limited due to the spacing between the supporting grooves 222, 222 or the speed of pitch-rotation.

Hereinafter, the operation of the X-ray inspection apparatus, in particular, a mechanism for turning the cylindrical secondary battery to be inspected to a desired position will be described based on the embodiment of the X-ray inspection apparatus according to the present invention described above.

Figure 2A:
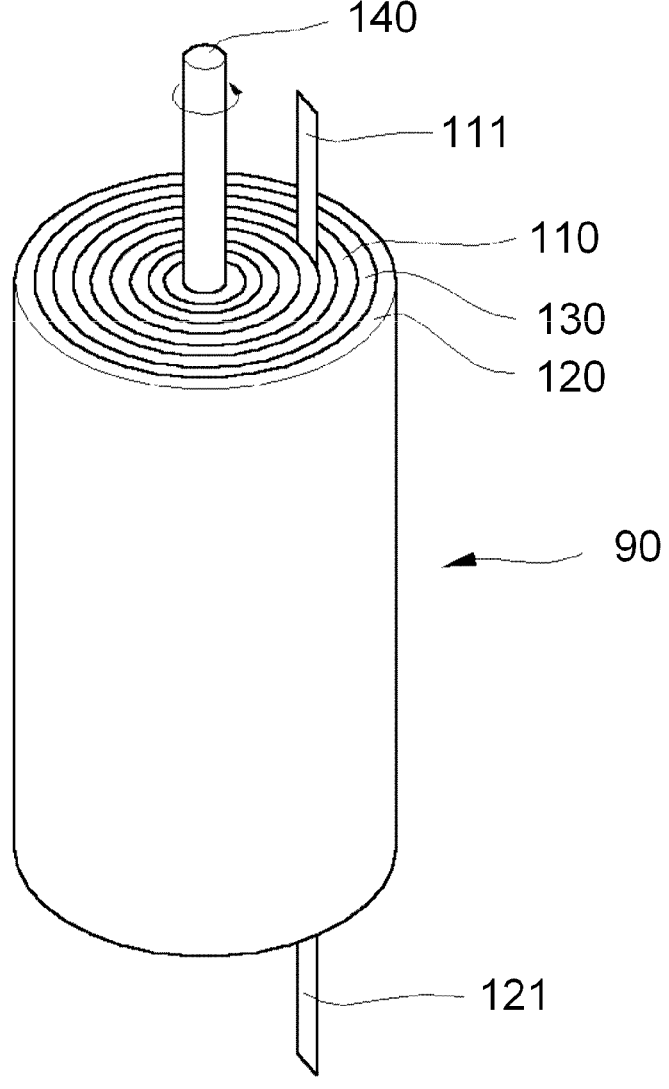
FIG. 2A illustrates an electrode assembly of a cylindrical secondary battery.
Figure 2B:
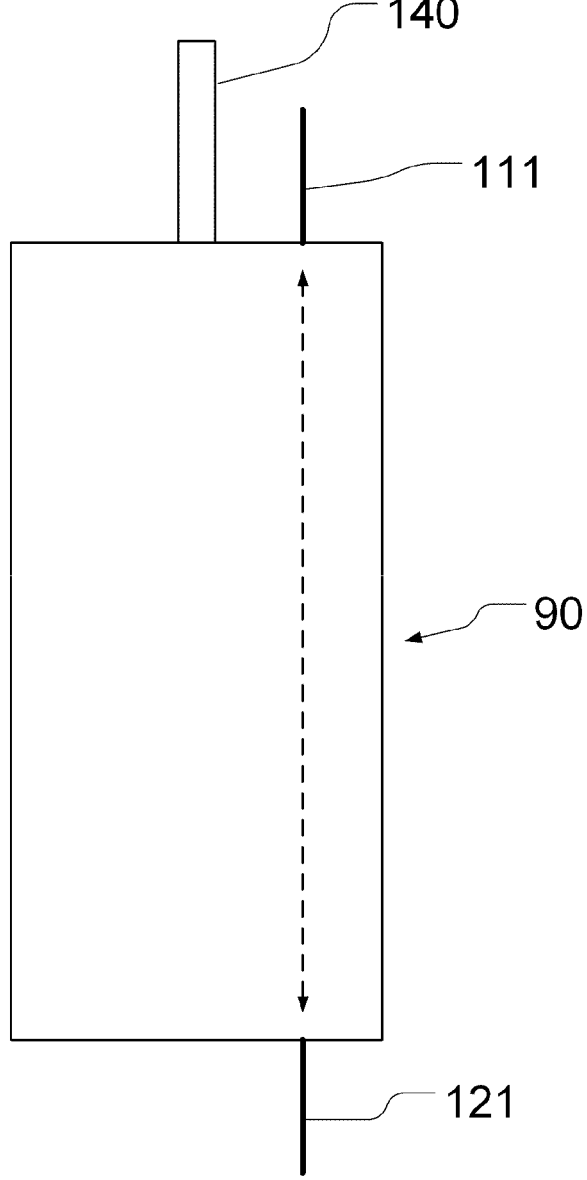
FIG. 2B is a side view of FIG. 2A.
Figure 2C:
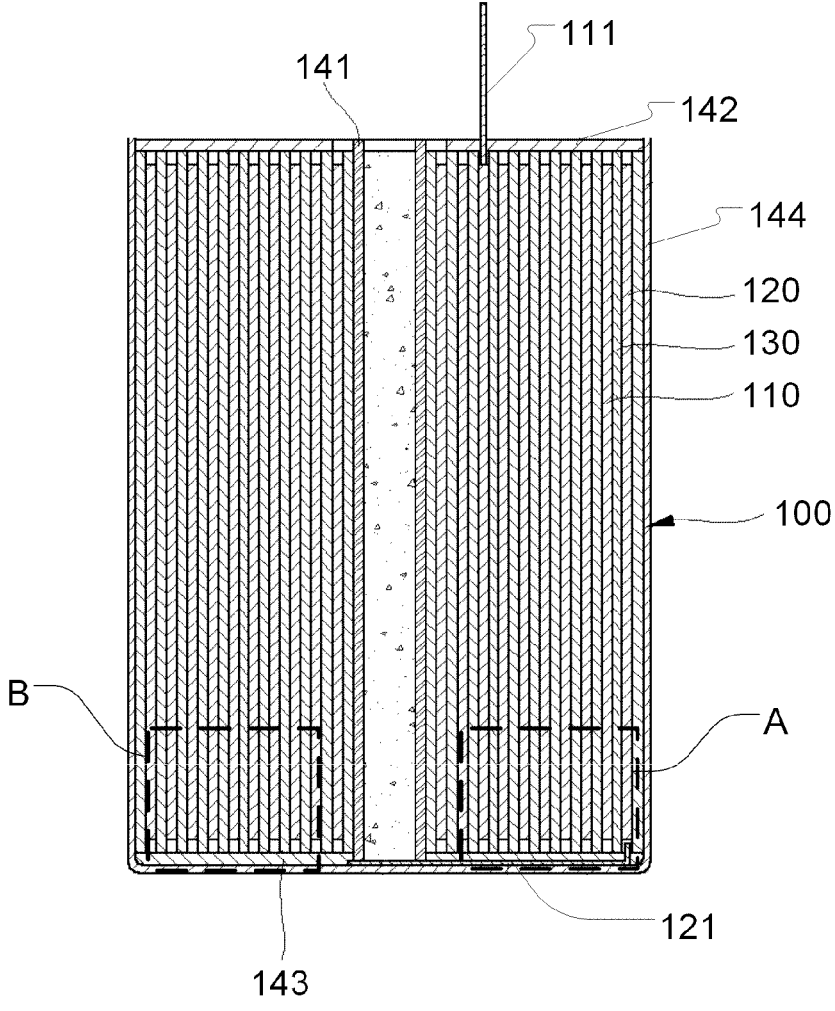
FIG. 2C illustrates a secondary battery in which one electrode tab protrudes.
Figure 3A:
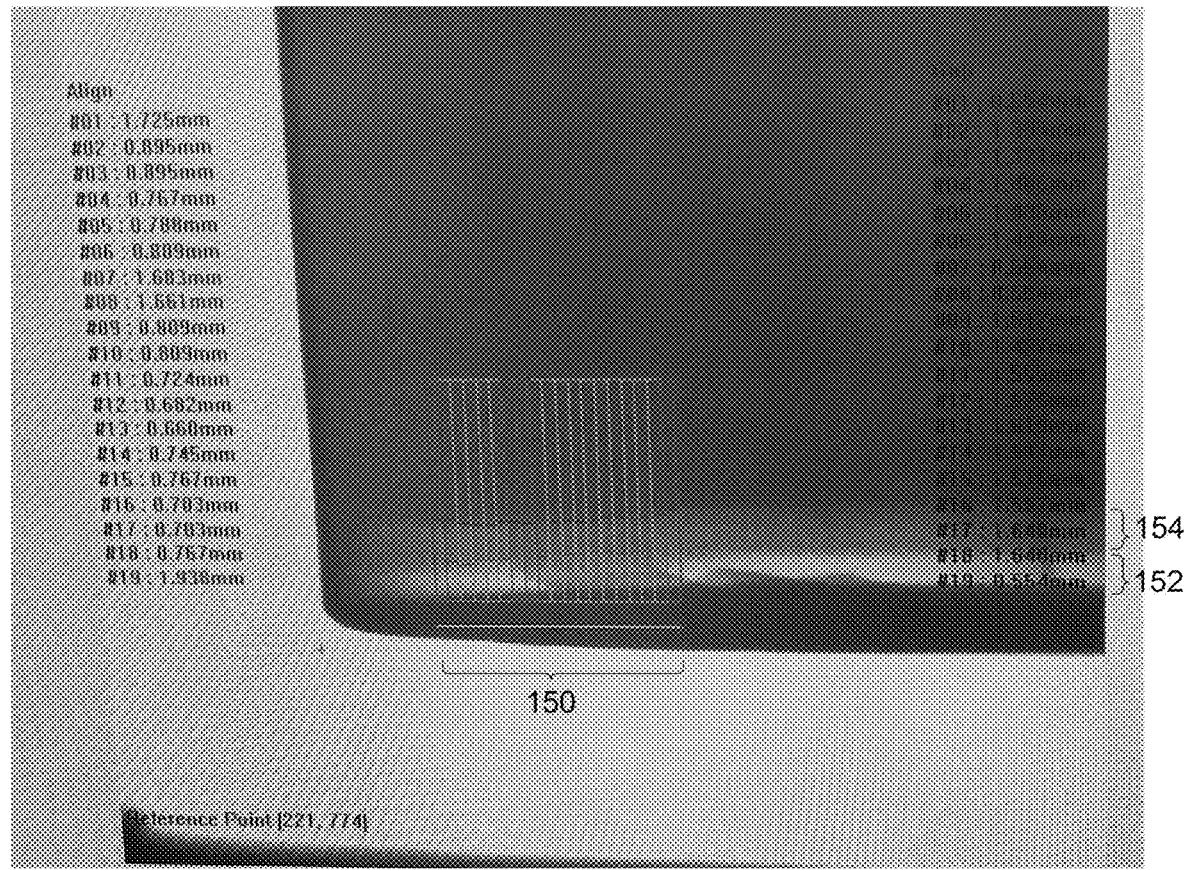
FIGS. 3A and 3B illustrate X-ray projection images of a cylindrical secondary battery.
Figure 3B:
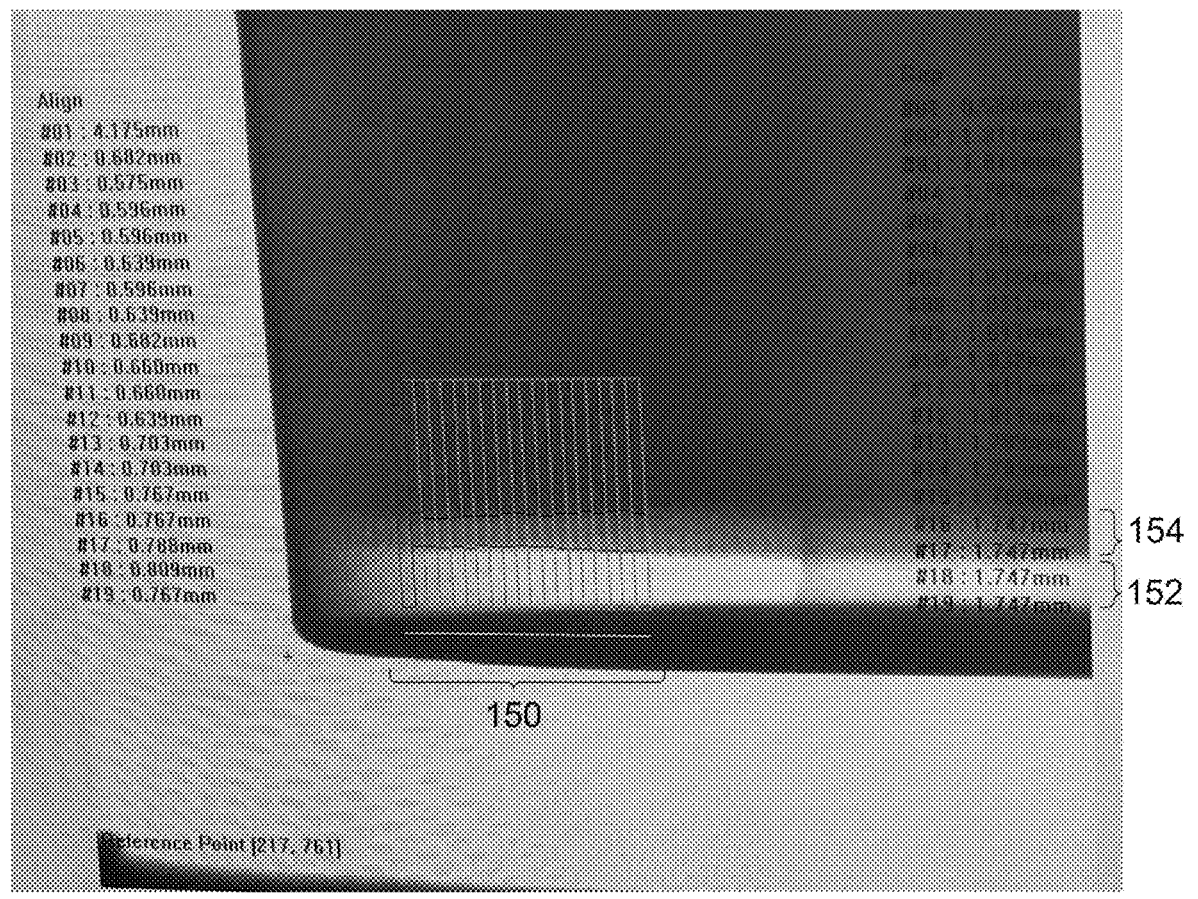

First, cylindrical secondary batteries to be inspected are introduced into the inspection chamber through a conveying unit such as a conveyor belt without covering the top cap, as shown in FIG. 2C. As shown in FIGS. 5A and 5B, secondary batteries are delivered to the rotational inspection body 220 via the rotary feeder 212, and the rotational inspection body can rotate while repeating rotation and stop operations at a constant pitch such as rotation-stop-rotation. For example, during an X-ray inspection of a object to be inspected, the rotational inspection body 220 may be in a stopped state, and may be rotated again when the inspection is completed. The pitch distance corresponding to the moving distance during one rotational operation of the rotational inspection body 220 may be predetermined, and may be set to be suitable for detection by the sensing unit and contact with the contact unit. For example, the pitch distance may correspond to a distance between two adjacent supporting grooves 222, 222.

As the cylindrical battery 100 pitch-rotates according to a predetermined pitch, the battery is aligned with the sensing unit so that the sensing unit can detect a specific element or part of the battery, in this embodiment, the position of an electrode tab protruded from the top of the battery.

Since the objects to be inspected, for example, a set of cylindrical secondary batteries, which are introduced into the inspection apparatus for a series of inspections, would have been manufactured by the same process, their structural features would be the same or similar. Accordingly, it is possible to calculate a desirable X-ray irradiation position for each of the secondary batteries of the same set by detecting the configuration characteristics of a set of secondary batteries, for example, the position of the protruding upper tab.

As described above, since the upper and lower tabs are symmetrically positioned above and below the battery in the manufacturing process, the position of the lower tab can be known from the position of the upper tab.

FIG. 10 illustrates a configuration in which the sensing unit 250 and the contact unit 270 according to the above-described embodiment detects and turns, respectively, the cylindrical secondary battery 100 to be inspected. First, second, and third sensing units and first, second and third contact units are used. For convenience of explanation, the states in which one secondary battery is moved (i.e., (a) to (g)) are shown in one drawing.

Referring to FIG. 10, in this embodiment, the X-ray source is configured to irradiate the left portion of the battery to be inspected (when examining the lower part of the electrode, see the dotted line "B" portion in FIG. 2C) (see FIG. 10, position (g)). Therefore, it is necessary to arrange the batteries so that there are no electrode tabs in the X-ray irradiation area "G".

In FIG. 10, the target inspection area is indicated by hatching on the upper surface 160 of the secondary battery. Turning the battery so that the X-rays irradiate into the target inspection area is described below.

In this embodiment, as shown in the drawing, the upper surface 160 is divided into a first angular range "α", a second angular range "β", and a third angular range "γ", the sizes of which are 90 degrees, 60 degrees, and 30 degrees, respectively. The first, second and third sensing units are configured to detect whether the upper tab 111 is present within the first, second and third angular ranges, respectively.

In addition, the first, second and third contact units 270, 270' and 270" are configured to turn the battery by 90 degrees, 60 degrees, and 30 degrees, respectively. For example, the contact length ("D", see FIG. 9A) of the contact unit 270 is set as the length for turning the cylindrical battery 100 by 90 degrees.

Whether or not the first contact unit 270 is operated is determined according to the position of the electrode tab 111 sensed by the first sensing unit 250. In other words, when it is sensed that the electrode tab is not in the desired position, the operation of the first contact unit is commanded. In FIG. 10, since the tab 111 is in the first angular range "α" when the battery is in the position (a), the first sensing unit 250 senses it and causes the first contact unit to operate (in position (b)). The first contact unit 270 achieves a turning angle of 90 degrees.

In position (c), since the tab is in the second angular range β, the second sensing unit 250' senses it and causes the second contact unit 270' to operate (in position (d)). The second contact unit 270' achieves a turning angle of 60 degrees.

In position (e), since the tab is in the third angular range γ, the third sensing unit 250" senses it and causes the third contact unit 270" to operate (in position (f)). The third contact unit 270" achieves a turning angle of 30 degrees.

Thereafter, the battery reaches the X-ray irradiation position in the supporting groove 222 without additional turning, and as a result, the X-ray irradiation is performed on the target inspection area (hatched area).

As described above, by the sensing unit and the contact unit according to the present invention, X-rays may be irradiated onto the target inspection area of the cylindrical secondary battery to be inspected.

On the other hand, if the tab 111 is located within the second angular range "β", the first contact unit 270 will not operate, whereas the second and third contact units 270' and 270" will operate. Likewise, if the tab is within the third angular range γ 111 at position (a), only the third unit 270" will operate. In all of the above cases, an X-ray irradiation is performed on the target inspection area.

On the contrary, if the tab at position (a) is not present in any of the first, second and third angular ranges, which means that there is no need to move the position of the tab, no contact unit will operate.

As described above, the number of sensing units and contact units may be changed by varying the sensing range of the sensing unit or adjusting the contact length of the contact pad.

Alternatively, a combination of one sensing unit and a plurality of contact units would also be possible. That is, it would be possible to selectively operate a plurality of contact units to obtain a desired amount of turning after determine the required turning angle by one sensing, with the turning angle by each of the plurality of contact units predetermined.

Alternatively, it may be possible to integrally configure the sensing unit and the contact unit to perform both the sensing operation and the contact operation.

In addition, when the upper tab of the cylindrical secondary battery to be inspected does not protrude, it may be possible to detect a configuration characteristic that can indicate the position of the electrode tab, such as a marker displayed on the outer peripheral surface of the battery instead of the protruding tab.

According to the above-described operation process, once the cylindrical secondary battery to be inspected takes a desirable inspection orientation, no additional turning of the battery will occur since the supporting groove of the rotational inspection body generally retains adhesive force such as magnetic force. Accordingly, as the rotational inspection body 220 continues to rotate, the desired inspection orientation is maintained until the irradiation positions of the first X-ray source 230, and subsequently, the second X-ray source 231 are reached.

As a result, according to the X-ray inspection apparatus of the present invention, irrespective of the orientation when a cylindrical secondary battery is first introduced into the inspection apparatus, X-rays can be irradiated to a target area for all batteries, and thus always a good X-ray projection image can be obtained.

In the above, specific preferred embodiments of the present invention have been shown and described. However, the present invention is not limited to the above-described embodiments, and various modification and alterations will be possible by any person having ordinary knowledge in the technical field belonging to the present invention without departing from the gist and spirit of the present invention claimed in the appended claims.

| - Explanation of the reference numbers - | |
|---|---|
| 100: object to be inspected, secondary battery | 110: positive electrode plate |
| 111: positive electrode tab | 120: negative electrode plate |
| 121: negative electrode tab | 200: X-ray inspection apparatus |
| 210: transporting conveyor | 212: rotary feeder |
| 220: rotational inspection body | 222: supporting groove |
| 230, 231: X-ray source | 235, 236: X-ray detector |
| 250: sensing unit | 252: sensor |
| 254: sensor bracket | 270: contact unit |
| 272: contact pad | 273: pad plate |

What is claimed is:

1. An X-ray inspection apparatus for a cylindrical secondary battery, said X-ray inspection apparatus comprising:
   an inspection chamber;
   a transfer unit for transferring the cylindrical secondary battery into the inspection chamber;
   a rotational inspection body that rotates with the secondary battery held thereon;
   an X-ray source;
   an X-ray detector; and
   a discharge unit for discharging an inspected secondary battery to outside of the inspection chamber;
   wherein the X-ray inspection apparatus further comprising an alignment mechanism arranged along a rotation path of the rotational inspection body to align the cylindrical secondary battery;
   wherein the alignment mechanism includes at least one sensing unit for detecting a position of a specific portion of the cylindrical secondary battery, and at least one contact unit operable between a standby position incapable of contacting with the secondary battery and a contact position capable of contacting with the secondary battery; and
   wherein the at least one contact unit is configured to be operated based on a detection result of the at least one sensing unit, and when the at least one contact unit is operated to the contact position, the secondary battery is turned by a contact frictional force generated between the secondary battery and the at least one contact unit while the secondary battery continues to rotate with the rotational inspection body.

2. The apparatus of claim 1, wherein the cylindrical secondary battery has an electrode tab protruding at its upper end, and the alignment mechanism is configured to align the electrode tab.

3. The apparatus of claim 1, wherein the inspection body has a plurality of supporting grooves provided around the inspection body at a regular interval, and the supporting groove holds the secondary battery with an adhesion force.

4. The apparatus of claim 1, wherein the at least one contact unit includes a contact pad, and the contact pad has a contact surface contacting with the cylindrical secondary battery.

5. The apparatus of claim 4, wherein a turning angle of the cylindrical secondary battery is determined by a length of the contact surface.

6. The apparatus of claim 5, wherein the rotational inspection body is configured for pitch-rotation in an order of rotation-stop-rotation, and the at least one sensing unit is configured to detect the secondary battery when the rotational inspection body is in a stop operation during the pitch-rotation.

7. The apparatus of claim 6, wherein at least two sensing units and at least two contact units are arranged along the rotation path of the rotational inspection body, and the at least one sensing unit and the at least one contact unit are alternately arranged.

8. The apparatus of claim 1, wherein at least two sensing units and at least two contact units are provided, and
   wherein turning angles of the secondary battery for respective contact units are different and decrease from upstream to downstream of a rotating direction of the inspection body.

* * * * *